May 14, 1968

J. W. BOCK ET AL 3,383,506

X-RAY SPOT FILM DEVICE WITH AN IMPROVED SEQUENCER
AND CARRIAGE DECELERATING MEANS

Filed Nov. 5, 1965

*INVENTOR.*
JOHN W. BOCK
HAROLD E. TESKE

BY

ATTORNEY

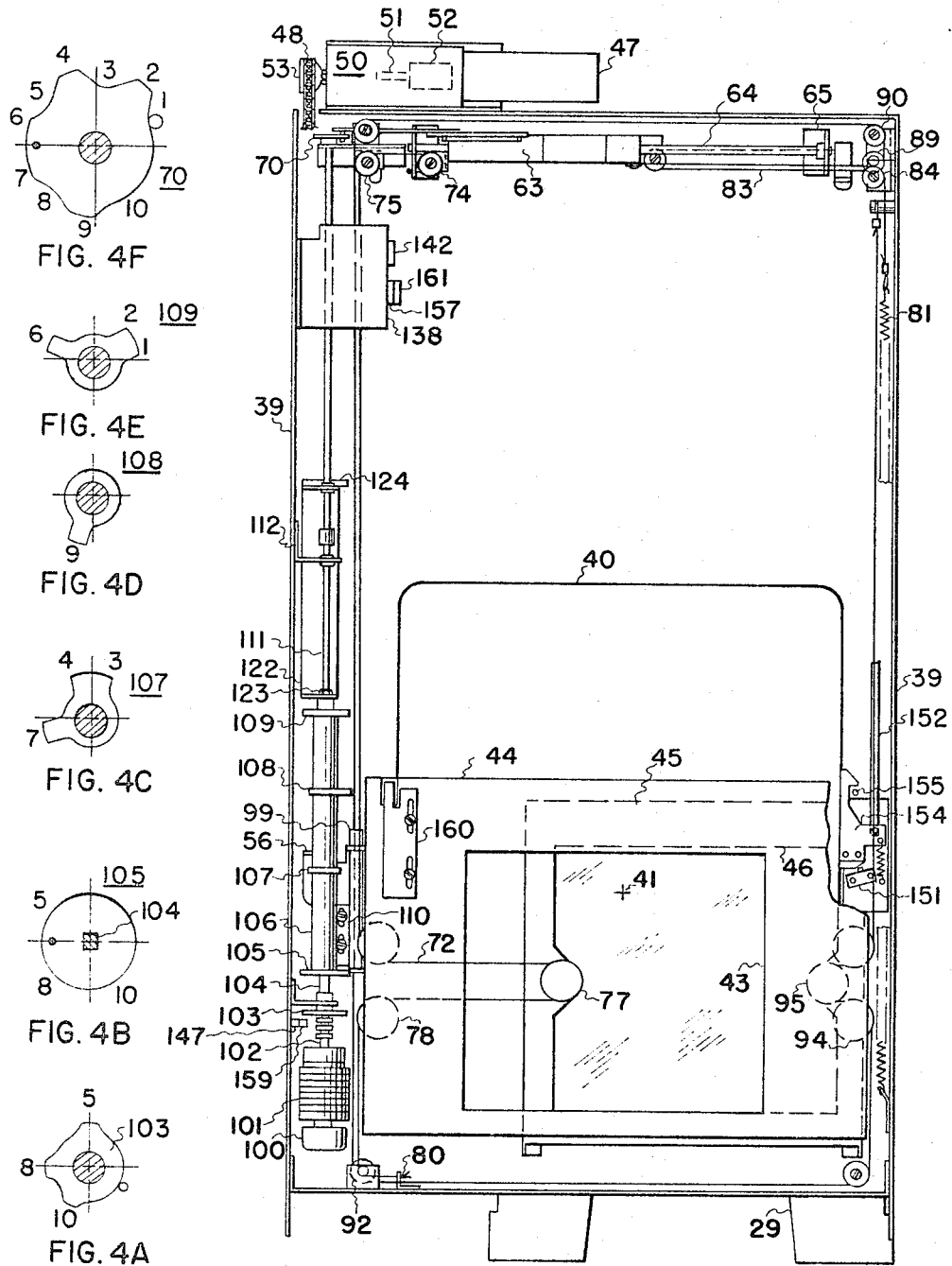

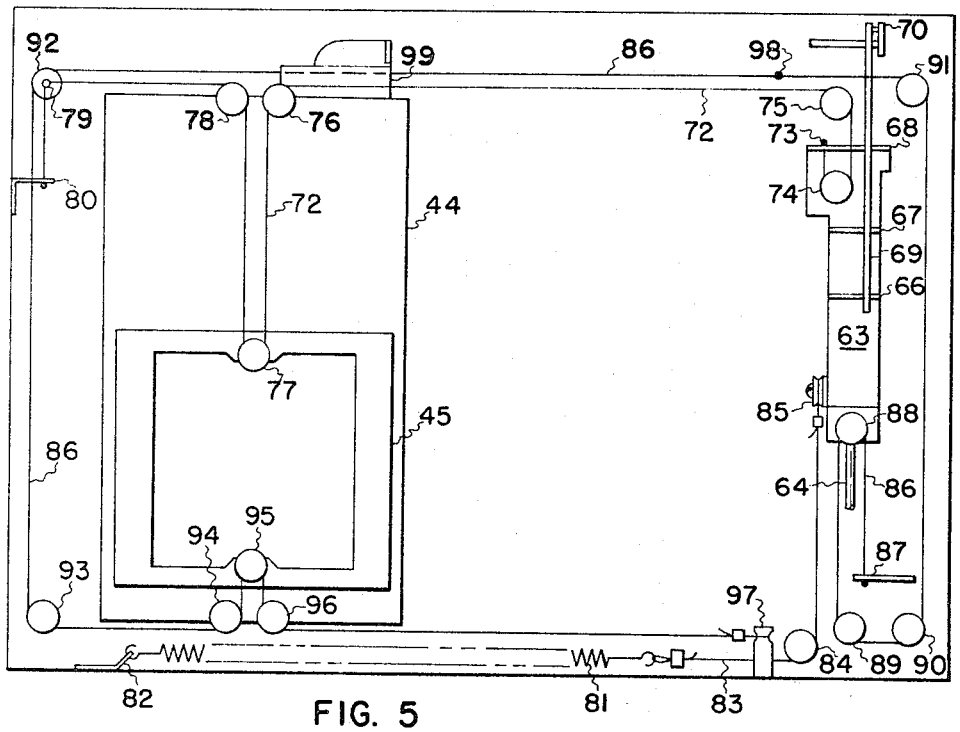
FIG. 5
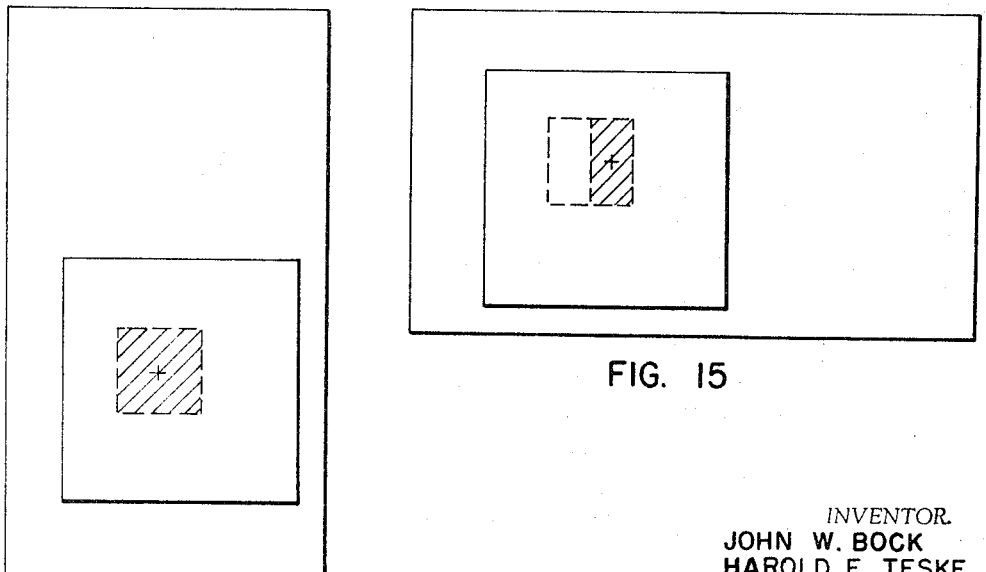
FIG. 14
FIG. 15

INVENTOR.
JOHN W. BOCK
HAROLD E. TESKE
BY
ATTORNEY

INVENTOR.
JOHN W. BOCK
HAROLD E. TESKE

ATTORNEY

# United States Patent Office 3,383,506
Patented May 14, 1968

3,383,506
X-RAY SPOT FILM DEVICE WITH AN IMPROVED SEQUENCER AND CARRIAGE DECELERATING MEANS
John W. Bock, Greendale, and Harold E. Teske, Milwaukee, Wis., assignors to General Electric Company, a corporation of New York
Filed Nov. 5, 1965, Ser. No. 506,548
5 Claims. (Cl. 250—66)

ABSTRACT OF THE DISCLOSURE

A carriage, that moves from parked to exposure positions under spring power, supports a cassette holder which is adapted to move crosswise of the carriage to expose all or selected portions of the film in the cassette when it is in the X-ray beam. A shaft is located parallel to the line of movement of the carriage. A cylinder is slideable on the shaft and has radially projecting stops of which one at a time is positioned to intercept the carriage and terminate its movement in a selected exposure position. The shaft supports a piston inside the cylinder to compress air and decelerate the carriage. The angular position of the shaft also sets a latch to engage different stops on a counterweight. The latter is spring-loaded by the same motor that returns the carriage. The spring transfers the cassette holder laterally during certain exposure sequences. The final position of the cassette holder depends on which stop is engaged by the latch.

---

This invention relates in general to diagnostic X-ray apparatus and, in particular, to improvements in spot film devices used with such apparatus.

A spot film device comprises a housing, commonly called a tunnel, that is mounted on an X-ray table for being moved longitudinally and laterally of the table top in planes that are parallel with it. X-rays from a source in the table pass through a patient on the table top and form an image of the patient's anatomy which may be visualized on a fluoroscopic screen at the top of the tunnel near its front end. In some installations, an X-ray image amplifier is substituted for the fluoroscopic screen in which case the X-ray image is converted to a bright visible image that may be viewed directly through an optical system in proximity with the amplifier or with a television camera and a remotely located monitor.

Toward the rear of the tunnel is a parking space for a film cassette. Mechanism is provided for projecting the cassette into the X-ray path to take radiographs of selected images that are observed in the fluoroscopic mode. After each radiograph is taken, the cassette is returned to parked position. The mechanism is adapted for enabling the taking of a sequence of radiographs on a single film. That is, the whole film may be exposed in one radiograph, or it may be exposed in halves or quarters in a predetermined order. After an exposure sequence is completed, the cassette may be projected to the front of the tunnel from which is may be removed through a radiation shielded access opening. An unexposed cassette may then be substituted through the same opening. Front loaded spot film devices have become popular again in cases where image amplifiers are used because of the inconvenience of reaching around the amplifier to replace a film cassette from the top of the tunnel while the cassette holder is parked near the rear of the tunnel.

Spot film devices generally employ electromechanical means for advancing and retracting a cassette between load and parked positions and between parked and the various positions in which a sequence of radiographs is taken. In addition, means are provided for predetermining the sequence and for cushioning the shock forces that are incidental to rapid transfer of the cassette carriage from parked position to its other positions when alternating between fluoroscopic and radiographic or loading modes.

These functions have been achieved in known devices by complicated arrangements of mechanical linkages, tracks, cams, relays, and so forth, which accomplished their purposes under manual or mechanical influence or under a combination of such influences. This complicatedness has resulted in lower than desirable reliability, massiveness that has had to be off-set with increased counterweight or power and noisy operation. Some of the complexity and size resulted from spot devices being adapted to accommodate rectangular cassettes in their long and short dimensions in which case means had to be provided for altering the mode of operation of the transfer and sequence mechanism depending on how the cassette was oriented in its holder.

The present invention is addressed to overcoming the above-noted disadvantages and to providing some new structural and functional features in a spot film device. It is a general object of this invention to provide a spot film device that is simple in construction, that has light weight, that operates quietly, safely, and automatically, that is easy to operate and maintain and is comparatively inexpensive to make.

Another object of this invention is to provide a new and simplified type of sequencer that enables both proximate and remote control over the fluoroscopic and radiographic sequences and that features reducing and simplifying the required number of parts by having a component of the sequencer serve the dual purposes of cassette positioning and at the same time acting as a shock absorber for the cassette carriage as it reaches its various positions. Still another object is to provide a spot film device that is adapted for use with square cassettes, resulting in further simplification of the cassette positioning mechanism.

Achievement of the foregoing and other specific objects will be evident from time to time throughout the course of the ensuing specification.

A general and then a more specific description of a preferred embodiment of the invention will now be given in reference to the drawings in which:

FIGURE 3 is a top plan view of the spot film tunnel with the covers and some of the other parts removed;

FIGURES 4A–4F illustrates the configuration of cams and stops that are used in the cassette sequencer and positioner mechanism according to the invention;

FIGURE 5 is a plan view, looking in the same general direction as in FIGURE 3, of that part of the cassette positioning mechanism which relates to transferring the cassette holder laterally of the spot film tunnel or lengthwise of the X-ray table during execution of an exposure sequence;

FIGURES 9–15 show positions of the film cassette corresponding with steps in the different exposure sequences that are obtainable with the invention;

Figure 1:
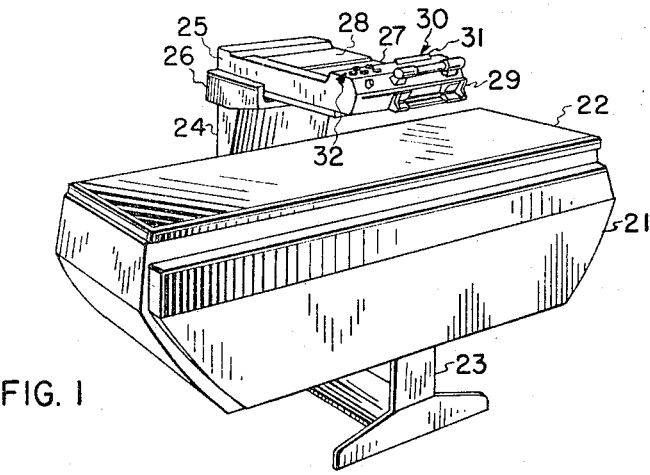
FIGURE 1 is a perspective view of a diagnostic X-ray table that is equipped with the new spot film device.

FIGURE 1 shows a typical X-ray table body 21 provided with a flat patient supporting X-ray transmissive top 22. Table body 21 may be tilted on its support 23 to either upright position in a well-known manner. Extending vertically next to the back of body 21 is a spot film tower 24. The bottom of the tower, not shown, is provided with a base that extends into body 21 and runs on tracks so that the whole tower may be translated longitudinally of table top 22. The spot film tunnel 25 is mounted in a guide 26 at the top of the tower so that the tunnel may be slid back to a parked position or it may be pulled forward to a position over the table top 22 as it is shown in FIG. 1. Thus, bilateral movement of spot film tunnel over the table top is provided for.

Within X-ray table body 21 an X-ray tube, not shown, is mounted on the base of tower 24 so that alignment between the focal spot of the X-ray tube and a fixed point on the tunnel is maintained when the spot film tower is translated longitudinally of the table. When tunnel 25 is locked with respect to its guide 26, lateral alignment of the X-ray tube and spot film tunnel are maintained because the base of the tunnel also translates laterally of the table jointly with the spot film tunnel.

The fluoroscopic screen is visible from the top of tunnel 25 in the region of the reference numeral 27. When an X-ray image amplifier, not shown, is used, it would extend upwardly from and be attached in the same region 27. The film cassette may be parked during fluoroscopy in the back part of tunnel 25 designated generally by the reference numeral 28. The cassette may be admitted to the tunnel through a cassette loading port 29 at the front end of the tunnel. Later a detailed description will be given of a cassette carriage that is located in tunnel 25 and is adapted to move a cassette from the rear parking region 28 to the fluoroscopic and radiographic region 27 near the front of the tunnel for taking a radiograph subsequent to fluoroscopy. A further description will also be given of a cassette holder that rides in the carriage and is adapted for movement to appropriate positions crosswise of the spot film tunnel for taking various radiographs in a sequence on a single film.

Most of the controls for conducting radiographic and fluoroscopic techniques such as the X-ray shutter controls, exposure switches, switches for controlling the fluoroscope tower and tunnel locks, and so forth, are located on the top and near the front of tunnel 25 in a region that is identified by an arrow and the reference numeral 30. In the same region there is shown a cassette transfer bar 31. It will appear later that the operator may press transfer bar 31 momentarily to either cause the cassette to be projected to its radiographic position or reload position near the front end of the tunnel or to be returned to its parked position near the rear.

Also shown on top of the tower near the front end are four push button stations and film position indicating lights which are collectively identified by the reference numeral 32 in FIGURE 1.

Figure 2:
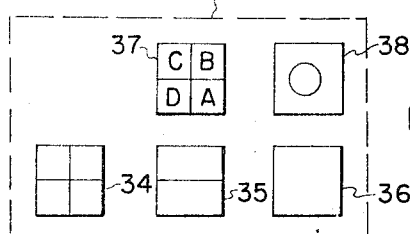
FIGURE 2 shows an arrangement of push button switches and indicator lights for selecting exposure sequences in accordance with the invention.

The actual arrangement of the indicator lights and push buttons are shown in plan view in FIGURE 2. This arrangement of push buttons and indicator lights constitutes a sequence selector station, the function of which will now be described in order to familiarize the reader with operation of the spot film device before proceeding with the details of its construction. One of the advantages of the invention is that sequencer control station 32 need not be located on the spot film device, but may be remotely located.

In reference to FIGURE 2 it may be observed that the sequence selector station has several functions (1) it serves as a means of selecting the area of film to be exposed and (2) it indicates the area of film that will be exposed when the cassette is next moved to the radiographic position. To select an exposure area, depress any one of three appropriately marked push buttons 34, 35, or 36 to obtain full, half, or quarter-films, respectively. Hold the push button depressed until the desired exposure area is illuminated on the sequence indicator 37. For example, if the operator desires to take a sequence of quarter-films, push button 34 is depressed, and if the cassette is in parked position as it must be during sequence selection, a light will go on in the D section of indicator 37 showing that a corresponding section of the film will be the first to be exposed. Forward transfer of the cassette to radiographic position is initiated after selection by depressing cassette transfer bar 31 which is located near the front of the cassette tunnel. After the X-ray exposure is taken, transfer bar 31 is again momentarily depressed to cause the cassette to return to parked position. At this time automatic sequencing occurs in which case a lamp in the region A of the indicator 37 will go on to show that it is the next area that will be exposed on the next radiograph. These steps are repeated until all of the quarter-section A–D of the film are exposed in which case conditions are set automatically in the spot film device for permitting removal of the exposed cassette and insertion of a new one.

If the operator desires to take a sequence of half-film exposures, push button 35 is depressed in which case indicator lights D and A will go on to show that a corresponding area of film will be exposed during the next radiograph. After this radiographic exposure, lights B and C will go on to indicate the next exposure. A full film exposure may be taken by depressing push button 36 and operating transfer bar 31 before and after exposures as indicated above.

A fourth, single step push button 38, marked with a circle, permits combining two quarter-films with one half-film or vice-versa. For example, the quarter-film button 34 may be depressed to make the first two exposures. The half-film button 35 may be depressed next and then the single step button may be depressed once to make the third exposure. Conversely, the half-film button 35 may be depressed to make the first exposure and then the quarter-film button 34 may be depressed, followed by depressing the single step button 38 twice to make the second and third exposures.

Note that the half-film exposures are divided by a line that runs crosswise of the spot film device. In another embodiment of the invention, there is another push button similar to 35 which is divided lengthwise of the spot film device. The additional half-film push button requires modifying the sequencer mechanism and wiring diagram in a minor way which will not be discussed because the principle of half-filming in accordance with the invention may be demonstrated adequately in the depicted version of the invention.

Summarizing operation preliminarily, the illuminated sequence indicator 37 displays the exposure position the cassette carriage will assume on the next excursion from the parked position. Each time the carriage returns from the radiographic position, the sequencer automatically advances to the next position, and the sequence indicator 37 changes accordingly. At the conclusion of a sequence, upon depressing transfer bar 31, the sequence indicator lights turn off and a load light in the cassette receiver port 29 turns on. On the next excursion from the parked position, the cassette carriage will go to the load position which is as far to the front as the carriage will go. Unless the sequence selector is reset to start another series, the carriage will continue to go back and forth from load to parked position when the transfer bar 31 is depressed.

As a safety measure, the X-ray exposure switches, not shown, but which are located on the spot film device in the region 30 near the cassette transfer bar 31, are rendered inoperative when the cassette carriage is in the load position. Fluoroscopic exposures can be made as soon as the carriage is returned to the parked position. Radiographic exposures can be made as soon as one of the sequence selector push buttons is depressed and the carriage has been brought forward by operation of the transfer bar 31.

Attention is now invited to FIGURE 3 for a discussion of the structural features of the spot film device that are pertinent to the present invention. The spot film device comprises a sheet metal housing 39 which has a large X-ray permeable window 40 in its bottom. The center of the window, and correspondingly, the center of the X-ray beam and image is identified by a point bearing the reference numeral 41. The size of the X-ray beam is regulated by shutters that are associated with the X-ray tube in table body 21 but the shutters and operating mechanism are not shown because they are conventional.

Within tunnel housing 39 and adapted to move from its front, as in FIGURE 3, to its rear is a cassette carriage 44. The carriage is essentially a frame that has a rectangular opening 43 through which the X-ray image may pass. Although they are not shown, carriage 44 may be provided with rollers and housing 39 may have tracks in which the rollers are engaged so that the carriage may be transported in a straight line from the front to the rear of housing 39. As shown, carriage 44 is in its position for loading or withdrawing a film cassette through port 29.

Mounted on and for executing crosswise movements with respect to carriage 44, is a cassette holder 45. Cassette holder 45 is also essentially a frame with an opening 46 that may be made to coincide partially or totally with opening 43 in the cassette carriage 44. In the actual construction, carriage 44 is provided with tracks and cassette holder 45 with rollers, the tracks and rollers not being shown, so that the cassette holder 45 may be translated crosswise of the cassette carriage 44 in accordance with the exposure sequence that has been chosen. For present purposes, it is sufficient to observe that the film cassette, which is preferably square and is not shown, may be deposited on the cassette holder 45 for being transported crosswise of housing 39 on the cassette holder and lengthwise thereof on the cassette carriage 44.

In operation, cassette carriage 44 is projected to its various positions toward the front of housing 39 under the influence of a spring. Carriage 44 is returned to parked position near the rear of housing 39 under the influence of an electric motor 47. In FIGURE 3 motor 47 is located to the rear of housing 39. The motor drives a chain 48 for storing energy in a cassette forward transfer spring 49, see FIGURE 6, through a clutch assembly 50 which is symbolized by a rectangle and shown coupled with motor 47 in FIG. 3. The motor and clutch assembly are a commercially available type. It is sufficient to say here that clutch 50 is adapted to permit motor 47 to drive chain 48 in one direction and to disconnect the motor from the chain so that the chain 48 may be translated in an opposite direction under the influence of cassette forward transfer spring 49 under another condition. Release of the clutch is accomplished by a pawl 51 that can be engaged and disengaged under control of an electromagnetic relay or solenoid 52 which is only symbolized in FIGURE 3.

Figure 6:
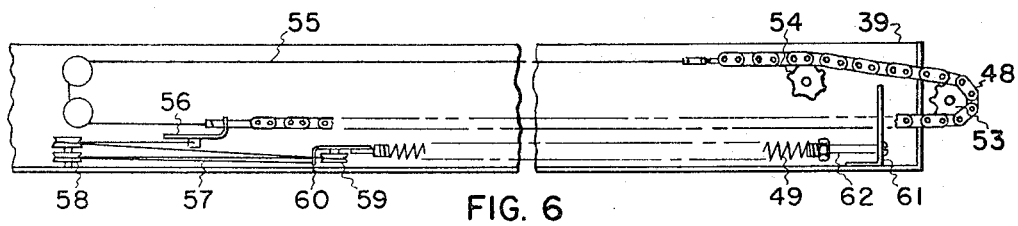
FIGURE 6 shows a side elevational view of part of the mechanism for projecting the cassette toward the front under the influence of a spring and for restoring the cassette to parked position under the influence of a motor-driven chain.

FIGURE 6 shows additional parts of the carriage 44 transfer mechanism which are not shown in FIGURE 3. Thus, it may be seen that a sprocket 53 which is on a shaft extending from clutch 50 is meshed with chain 48. There is also an idler sprocket 54 mounted for rotation with respect to housing 39. When sprocket 53 rotates counterclockwise while being driven by motor 47, the top of chain 48 moves to the left and the bottom to the right. This causes tension in a cable 55 which closes the chain loop and connects with a bracket type link 56. Attached to the latter is another cable 57 which, to obtain mechanical advantage, is threaded over some pulleys 58 and a translatable pulley 59, in particular, which is carried on a spring adapter bracket 60. Cassette carriage forward transfer spring 49 is attached to bracket 60 at one end and at its other end to a fixed bracket 61 which is provided with a spring tension adjusting screw 62. Thus, it may be seen readily that when sprocket 53 is turned counterclockwise, spring 49 will be stretched, and that when the sprocket is released for free rotation by operation of clutch 50, the spring 49 will contract and give up its stored energy. The mechanism just described is coupled with the cassette carriage 44 through the agency of bracket 56 so that the carriage may be moved to the rear of housing 39 under motor influence and toward the front thereof under the influence of spring 49. It will be appreciated that when clutch 50 is released, spring 49 will project the carriage forward rapidly so that a radiograph may be taken with a minimum of delay after something of interest is observed in the fluoroscopic mode. Motor return of the carriage and simultaneous loading of spring 49 occurs at a somewhat lower rate.

Figure 7:
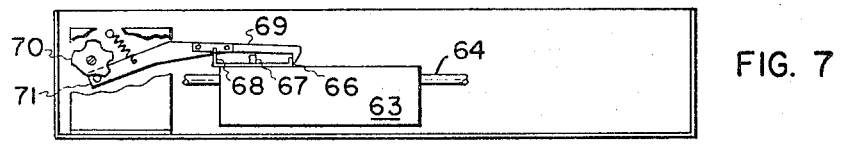
FIGURE 7 is a partial elevational view taken near the rear of the cassette tunnel showing the counterweight for the cassette holder and the mechanism for controlling the same.

Consideration will now be given to the mechanism involved with actuating cassette holder 45 crosswise of cassette carriage 44 during certain exposure sequences. In this connection, reference will be made to FIGURES 3, 5, and 7. The principal components of the cassette holder transfer mechanism can be seen best in FIGURE 5 where they are isolated from other components in FIG. 3. In FIGURE 5 it may be seen that cassette holder 45 is mounted for sliding movement across carriage 44. Because the X-ray table and cassette tunnel tilt from horizontal to vertical and intermediate positions, it is necessary to counterbalance holder 45 with a counterweight assembly designated generally by the reference numeral 63. The latter is carried for sliding movement on a rod 64 which is held at its ends by suitable brackets 65, one of which may be seen in FIG. 3. As indicated above, the location of cassette holder 45 at the time of taking a radiograph depends on the exposure sequence that has been chosen, and it follows that since the holder may be moved in varying amounts, the counterweight assembly will need to be moved correspondingly different amounts. The counterweight assembly has three stops corresponding with short, intermediate, and long travel of the cassette holder 45. These stops are numbered respectively 66, 67, and 68. Mounted over the counterweight assembly is a latch bar 69 which is actuated by a cam 70 in accordance with operation of a sequencer which will be described later. For the time being, it is sufficient to note by referring to FIGURE 7 in particular, that the various stops 66, 67, and 68 are of different heights so that a selected one of them may be engaged by latch bar 69 depending on the angular position of cam 70 which oscillates the latch bar on appropriate occasions by acting on a pin 71 near its end.

In FIGURE 5 it is seen that there is a cable 72 having one of its ends attached at 73 to the counterweight assembly 63. This cable runs over a pulley 74 on the counterweight and around a stationary pulley 75 from which it extends around pulley 76, 77, and 78, and a guide pin 79 after which it is attached to a bracket at 80. With this arrangement, it is evident that if counterweight assembly 63 moves downwardly from its shown FIGURE 5 position, that cassette holder 45 will move upwardly, or in fact, crosswise of the cassette carriage and oppositely of the counterweight. The amount that holder 45 moves will, as explained, depend on the point at which latch bar 69 interrupts movement of the counterweight by engaging one of its stops 66, 67, or 68.

Counterweight assembly 63 is urged to move by a coil spring 81 that has one end attached at 82 and its other end connected with a cable 83 that runs over a fixed pulley 84 and attaches to the counterweight assembly 63 at 85. Another cable 86 has its end attached at 87 to a stationary bracket. Cable 86 loops around a pulley 88 on the counterweight assembly and then progresses around several pulleys 89, 90, 91, 92, and 93 the last four of which are located near the respective four corners of the spot film device housing. Cable 86 continues around a pulley 94, on the cassette carriage, and then around pulley 95 on the cassette holder 45 and finally around another pulley 96 on the cassette carriage from which it progresses to a termination at 97.

If counterweight 63 is released, it is subject to being transferred under the influence of coil spring 81. Upon this event, tension is created in cable 72 and due to the fact that the cable is attached at its end 80 and loops around pulley 77 on cassette holder 45, the cassette holder will be actuated by the influence of the spring 82. Under these circumstances, cable 86 will, of course, be placed in tension by the translational movement of pulley 95 on cassette holder 45 in order to hold the counterweight in its new position.

Whenever cassette holder 45 is transferred toward pulleys 76 and 78 on the cassette carriage as it appears in FIGURE 5, a ball 98 which is swaged on cable 86 advances toward a stop 99 which is attached to cassette carriage 44. Thus, whenever cassette carriage 44 is returned to its parked position near the rear of the spot film device, stop 99 will abut ball 98 and urge it back toward the position in which it appears in FIGURE 5. This causes tension in cable 86 to the left of ball 98 as shown, and results in the simultaneous pulling back of cassette holder 45 to its original position on the carriage. As the cassette holder progresses with its return movement, cable 72 is stressed to cause the counterweight assembly 63 to return to its original position. When the counterweight moves, of course, cassette holder actuator spring 81 is reloaded through the stress on cable 83.

It will be noted than any time carriage 44 is returned to its parked position that cassette holder 45 will be restored concurrently to its unactuated position as shown. Conversely, when a film exposure sequence is set that requires partial or total transfer of the cassette holder 45 across the carriage, this transfer will occur concurrently with movement of the carriage to its exposure position. As a result, any of the stops 66–68 on counterweight 63 are available for any step in any chosen sequence.

The counterweight assembly 63 is equipped internally with a cylinder that co-acts with a plunger, not shown, that is carried on guide rod 64. Suitable needle valves, not shown, are provided for controlling the rate of air discharge from the cylinder and thereby controlling the transfer velocity of the counterweight assembly. A concomitant of this is that the cassette holder transfer velocity may be adjusted to a maximum with minimum impact or shock.

The exposure sequence selector will now be described in reference to FIGURES 3 and 4. The sequencer is located along the left side of the spot film device and comprises a rotary solenoid 100 that takes thirty degree rotational or angular steps in a single direction each time electric power is applied. This type of rotating driver is characterized by advancing through a specific angle and then automatically disconnecting its electric circuit until it has rotated back and relatched for taking another driving step. The solenoid drives a plurality of switch decks which are identified generally in FIGURE 3 by reference numeral 101. Operation of the switches will be described later in connection with a description of the electrical circuitry. Projecting from the switch decks is a shaft 102 on which is supported a cam 103 that has the configuration shown in FIGURE 4A. This cam has to do with establishing safety conditions during reloading as will be explained later. From this point a coupling is made to a square shaft 104 which extends into a circular stop 105 that is fastened by brazing or epoxy adhesive, for example, to the end of a stop carrier that is otherwise called an air-check cylinder 106. By reason of square shaft 104 going into a correspondingly square hole in stop 105, it will be seen that angular rotation of the shaft will cause corresponding rotation of stop carrier cylinder 106 through one angular step each time solenoid 100 is pulsed. In this embodiment, cylinder 106 executes a complete revolution in twelve thirty degree steps. Also attached to and surrounding cylinder 106 are some additional cassette stops 107, 108, and 109, the configurations and angular relationships of which are shown in FIGURES 4C, 4D, and 4E, respectively. For descriptive purposes, cam 107 is designated the long carriage travel stop, cam 108 the intermediate travel stop, and cam 109 the short cassette carriage travel stop. Carriage 44 carries a bumper 110 that is adjustable to a limited degree in order to have the carriage 44 stop against the desired stop on cylinder 106 in the exact forward position in which a radiograph is desired to be taken.

Cylinder 106 is slidable axially of square shaft 104 the same amount each time the carriage is moved to the front. When the carriage 44 is moved toward its parked position, a downwardly extending leg on bumper 110 resets the cylinder 106 in its rearmost position so it may be slid toward the front of the spot film device again when the carriage comes forward. A guide 122 is attached at 123 to cylinder 106 in such manner that the guide will slide along with the cylinder on rod 111. Thus, cylinder 106 may be reset to its rearmost position by bumper 110 striking a downwardly projected extension 124 on the guide. This happens when the carriage 44 is nearly in its parked position. The amount that carriage 44 is moved to the front before coming to a stop depends on which one of the stops in FIGURE 4 are struck by bumper 110 on the carriage and this depends on the angular position in which the sequencer has set the stops. Later in connection with FIGURE 8, the internal construction of cylinder 106 will be explained at which time it will become evident that the cylinder also acts as a pneumatic cushion, or by another name, an air-check, that slows down carriage 44 gradually and in a controllable manner as it approaches radiographic position. For the time being, it is sufficient to note that the cylinder travel limiting stop is located on the inside of the cylinder 106.

Within cylinder 106, through some intermediate parts, square shaft 104 is coupled to a round rod 111 on which cylinder 106 also slides. This is to further guide cylinder 106 and prevent it from dropping out of alignment. A guide bracket 112 supports cylinder 106 in its axial movement by supporting the rod 111 and serves to further stabilize and preserve the alignment of the assembly. At the rearmost end of rod 111, cam 70 is attached for controlling counterweight 63 positions through latch bar 69 as mentioned earlier.

Figure 9:
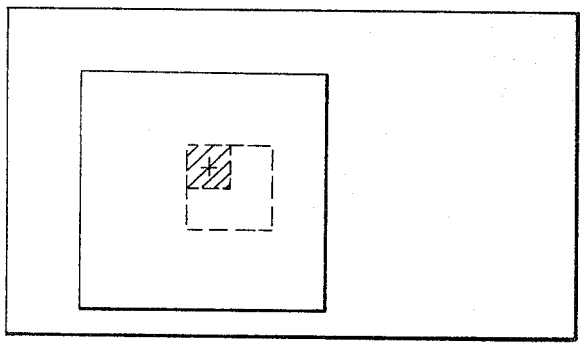

Assume that carriage 44 is restored to its parked position near the rear of the spot film device as shown in FIGURE 3, and that the sequence of four quarter-films has been selected by depressing push button 34. When transfer bar 31 is depressed momentarily, cassette carriage 44 would come forward, under the influence of forward spring 49, and bumper 110 would strike angular position or region 1 on stop 109 for short travel in which case the shaded quarter section of film shown in FIGURE 9 would be ready for exposure and prior to that time, indicator lamp D in the assembly 37 would be illuminated. After the X-ray exposure has been completed by means which are not shown, transfer bar 31 would be depressed momentarily to cause cassette carriage 44 to return to its parked position. For the exposure just described, cassette holder 45 would have come straight forward wihout transferring across carriage 44.

The next time the cassette transfer bar 31 is depressed, carriage 44 would advance until it struck the same stop 109 in position 2 which would be the case because of solenoid 100 being stepped automatically each time the carriage goes to parked position as will be explained later. When the sequencer is stepped to rotate cam 109 for stopping the carriage in its position 2, counterweight control cam 70 is stopped correspondingly on its position 2 in which case the counterweight latch bar 69 will be pivoted to an angle for catching long travel stop 68 on the counterweight 63 which controls cross-travel of cassette holder 45. Thus, for the second stop, when the carriage 44 comes forward, cassette holder 45 will be transferred simultaneously and the mechanism will be in readiness for an exposure of film area A when the carriage reaches its final position.

Figure 10:
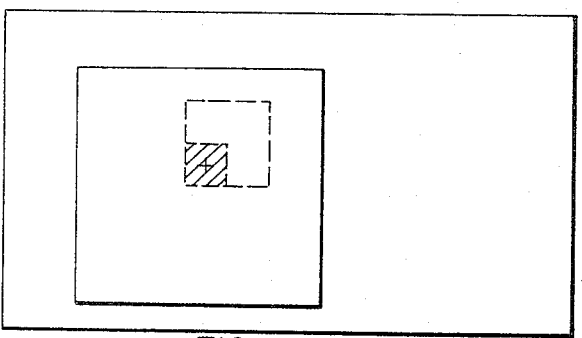
Figure 11:
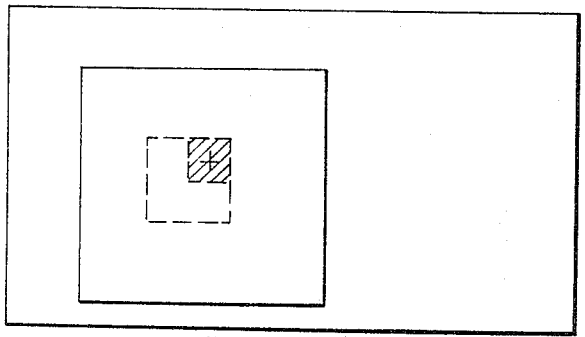

After the second exposure and return of the carriage 44 to parked position by reason of depressing cassette transfer bar 31 momentarily, the sequencer solenoid 100 steps cylinder 106 to its next angular step which allows bumper 110 to pass stop 109 and come to rest after it strikes position 3 on stop 107, this being shown in FIGURE 4C. Of course, each time bumper 110 strikes a stop, cylinder 106 is moved axially on its square shaft 104 against the cushioning effect of the trapped air within the cylinder. It might also be mentioned again that prior to the second exposure being taken, indicator light A would have been illuminated and prior to the third quarter-film exposure, indicator lamp C would have been illuminated. This corresponds with the quarter-film section that is shaded in FIGURE 10 for the second exposure. The shaded area shown in FIGURE 11 would be exposed during the third radiograph. In connection with taking the third radiograph, it may be seen that cassette holder 45 would not be transferred crosswise of carriage 44 but would come straight forward toward the front of the spot film device. This is because cam 70 would be in an angular position in which it would not actuate latch 69 to release it from counterweight stop 66.

Figure 12:
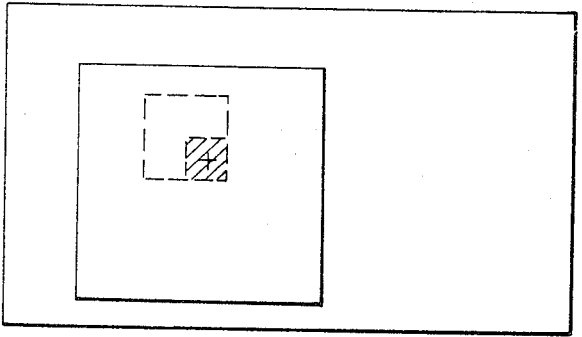

After the third exposure, cassette carriage 44 would be returned to parked position at which time the sequencer would be stepped once more, causing indicator lamp B to be illuminated and position 4 of long travel stop 107 to be placed in interferring relationship with bumper 110. Concurrently, cam 70 would attain its angular position 4 to set counterweight latch bar 69 for engaging counterweight stop 68 to correspond with long travel of cassette holder 45 across carriage 44. Under these conditions, after cassette transfer bar 31 is depressed, the carriage and holder reach a position to expose the section of film that is shown shaded in FIGURE 12.

When the sequencer cams and stops are rotated to their angular positions 5, 8, or 10, this corresponds with the conditions that accompany completion of a sequence. Thus, after the above-described quarter-section sequence is completed and the cassette carriage is restored to its parked position, angular position 5 will be attained automatically in which case the cassette carriage can be brought forward for reloading. Under these circumstances, circular stop 105 will be effective to arrest movement of the carriage but stops 107, 108, and 109 will not interfere because they have no extensions corresponding with angular position 5. Likewise, positions 8 and 10 are absent from the stops so that they may be cleared for moving the carriage into reloading position after completion of either a half-film exposure sequence or a full-film exposure.

The arrangement of the parts and electrical circuitry is such that the cassette carriage 44, on return travel, pulses the sequencer to advance it one step except when the carriage is parked for next being moved into load position, in which case the sequencer is disconnected automatically as will be explained. In any event, after the completion of a sequence, all of the indicator lamps in indicator 37 extinguish automatically. When the cassette transfer bar 31 is depressed for reloading a film cassette, other indicator lamps go on indicating that the carriage is forward and that conditions are set for reloading.

Figure 13:
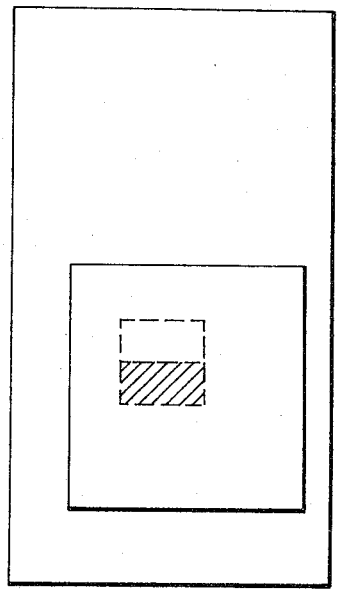

Continuing the operational description, it may now be assumed that an unexposed cassette has been inserted and by operation of cassette transfer bar 31, the carriage has been restored to parked position. Let us assume further that a sequence of two half-film exposures is desired in which case push button 35 would be depressed. This automatically causes the sequencer stops to be rotated until stop position 6 on short travel stop 109 is presented in the path of bumper 110 on the carriage. Angular position 6 also sets cam 70 so that it will position counterweight latch bar 69 for engaging short travel stop 67 on the counterweight 63. Indicator lamps D and A in indicator 37 will also be illuminated to shown the first half of the film that will be exposed. This area is shown shaded in FIGURE 13. When cassette transfer bar 31 is depressed, the carriage will move forward and at the same time cassette holder 45 will be transferred through its short travel, and bumper 110 will strike short stop 109 at position 6, thereby moving cylinder 106 endwise against the air cushion. After an X-ray exposure, the cassette carriage 44 is returned to parked position by depression of transfer bar 31. At this time the sequencer is advanced one angular step and lamps B and C in indicator 37 light up. In this case, only position 7 on the long travel stop 107 would be disposed in the path of bumper 110. Position 7 on cam 70 would correspond with engagement of counterweight 63 on its short travel stop 67 again. FIGURE 15 shows the shaded area that would next be exposed when transfer bar is operated to bring the carriage forward and transfer the cassette holder. After completion of this sequence and return of the carriage to parked position, the sequencer will advance one angular step automatically to angular position 8 which allows all stops to be cleared when the transfer bar is depressed to bring the carriage forward for reloading with a new film cassette.

The sequencer also permits taking one or the other half-film exposure and either of the pairs of quarter-section film exposures. To do this, one may press exposure button 34 initially and the first two quarter-section exposures may be made by the procedure described above. Then with the cassette in the parked position, the half-film button 35 may be depressed followed by depression of the single step push button switch 38 which is shown in FIGURE 2. The one additional step advances the sequencer stops from angular position 6 to angular position 7, in which case long travel carriage stop 107 would arrest bumper 110 and cam 70 would be set to restrain cassette holder 45 in its intermediate position through acting on short travel stop 67 of the counterweight assembly 63.

The cam and stop positions for first taking a half-film and then two quarter-sections will not be described for they can easily be deduced from the description of the converse sequence just given.

If a full-film exposure is desired, push button 36, in FIGURE 2, may be depressed at which time all four indicator lamps in the indicator assembly 37 go on. When the sequencer has completed stepping, intermediate stop 108 will be in the angular position 9 for arresting movement of the carriage when struck by bumper 110. Cam 70 will permit short crosswise travel of the cassette holder 45 and will cause stop 67 on the counterweight to be engaged. This will position the center of the cassette over the center of the X-ray beam 41 and enable a full-film exposure as shown by the shaded area in FIGURE 14.

After exposure of the full-film and return of the carriage to parked position, angular position 10 will be assumed by the cams and sequencer stops for enabling reloading the cassette. Likewise, all of the indicator lamps A–D will be extinguished after completion of the full-film exposure and return of the carriage to parked position prior to advancing it for reloading.

Figure 8:
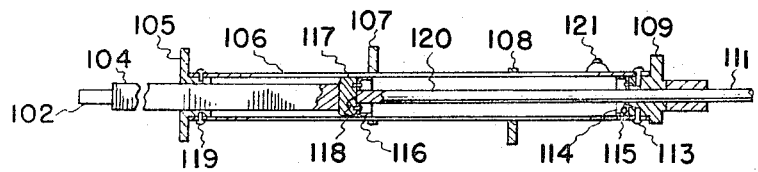
FIGURE 8 is a cross-sectional view of a part of the sequencer including an air-check cylinder and associated stops and cams.

Attention is now invited to FIGURE 8 for a more detailed description of the combined air-check and cassette carriage stop assembly. In this assembly, cylinder 106 is adapted to slide axially of round shaft 111 and square shaft 104 which are coupled inside of cylinder 106. Cam 109 extends into cylinder 106 at one end and is held in place by several screws 113. Riveted to an internal face of cam 109 is a cup-shaped piston 114 of leather or other pliable material which may be attached to cam 109 and thus to the cylinder by rivets 115. Another similar leather cup 116 is fastened to a cylindrical mount or guide 117. Cam 105 has a part that extends into the end of cylinder 106 and is secured with several screws 119.

Within cylinder 106 between leather cups 114 and 116 is a space 120 in which air may be trapped under pressure when cylinder 106 is moved axially to bring cup 114 closer to stationary cup 116. Air pressure so created resists axial movement of cylinder 106 and thus acts as a pneumatic cushion for the cassette carriage when it strikes one of the stops on the outside of the cylinder. A bleeder valve 121 is provided for controlling air pressure within the space 120 and hence, the deceleration rate of the carriage. The bleeder 121 is always in communication with air space 120 because the bleeder moves along with the cylinder as the cups are brought closer to each other. Of course, the cylinder encounters no resistance on its return travel because the radial expansive force on cup 114 is relieved when the latter moves in the opposite direction.

Figure 16:
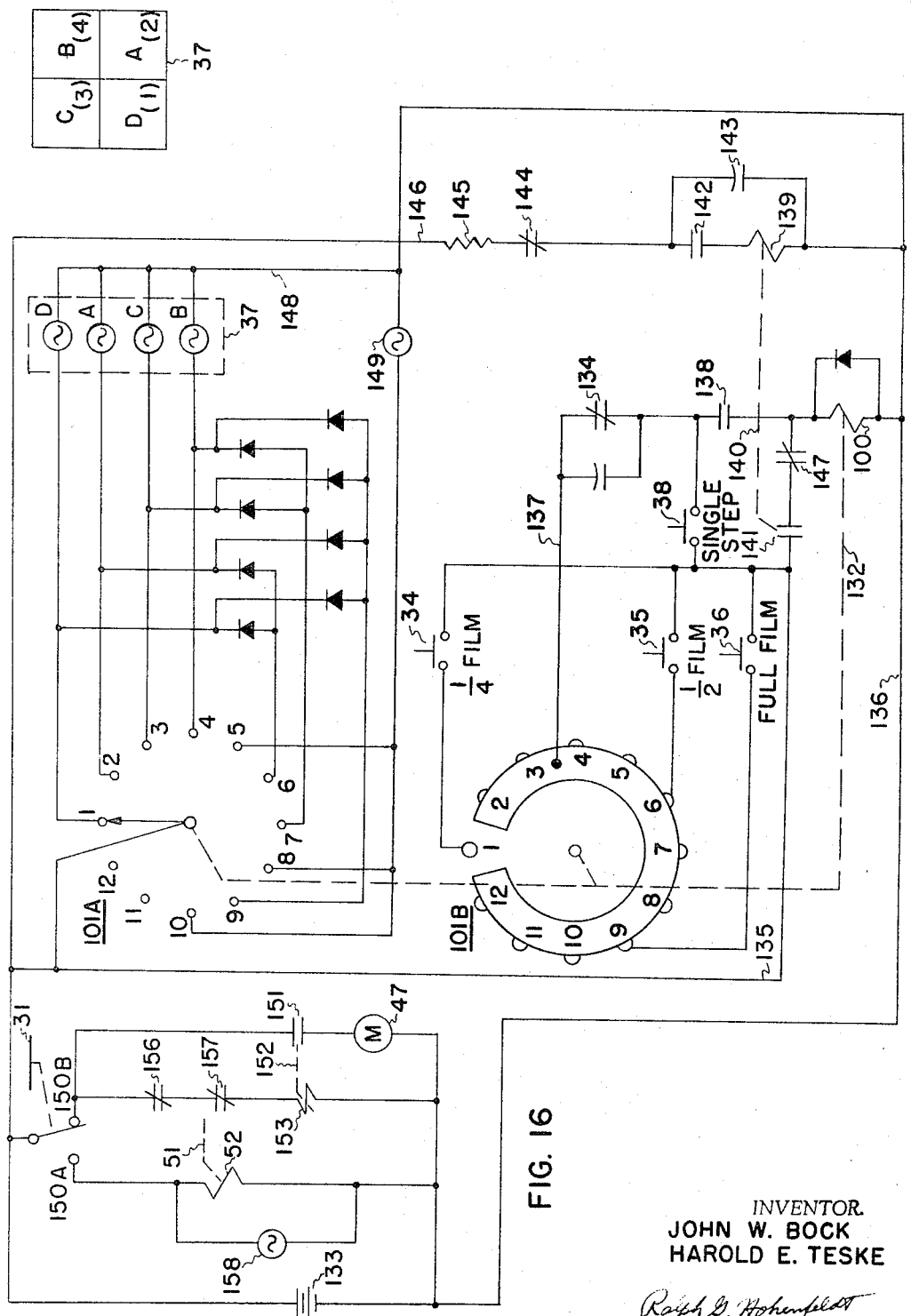
FIGURE 16 is an electrical diagram that is related to the invention.

Refer now to FIGURE 16 in connection with which the principal electrical features of the new spot film device will be described. Rotary switch operator 100 and some switches 101 have been mentioned briefly previously in connection with describing the operation of the sequencer. These components are physically located in the lower left corner of FIGURE 3. In FIGURE 16 the operator is symbolized as a coil 100 and the switch decks are marked 101A and 101B. These are on a common shaft or mechanical linkage that is symbolized by broken line 132 and shown connected with rotary solenoid operator coil 100. Each time operator coil 100 is pulsed, decks 101A and 101B advance rotationally through thirty degrees. In other words, each deck has twelve angular positions. As explained earlier, when solenoid 100 is energized it executes a step at the end of which it is interrupted by itself through the agency of an interrupter contact 134. Thus, when the solenoid resets itself after interrupter 134 opens, the solenoid is ready to take another step, and will do so as long as its energizing circuit is maintained. It will be seen that deck 101B comprises a metal swinger which has a gap or null point shown coinciding with position 1. In this condition, there is an open circuit from positive line 135 through solenoid 100 to negative line 136. Swinger 101B reached this null position by having the carriage 44 back in the parked position and then depressing push button 34 to set up for taking a series of quarter-films. Assume for example, that the swinger is so positioned angularly that its null point coincides with any position other than angular position 1. Assume further that quarter-film button 34 is depressed. This completes a circuit from positive line 135 through switch 34 and a continuing series circuit through the swinger, line 137, interrupter contact 134, solenoid 100 and then to negative line 136. Also included in this circuit is a contact 138 which is normally closed when the carriage is in parked position. As long as button 34 is maintained in its depressed state, the swinger will continue to rotate step-by-step under control of interrupter contact 134 until null position 1 is reached. Solenoid 100 is then open-circuited, as shown.

Whenever cassette carriage 44 returns to parked position after an exposure has been made, solenoid 100 is pulsed automatically to advance swinger 101B one step clockwise in this example. It may be seen that when this process is repeated four times, or until all the quarter-films are taken, the null point of swinger 101B will coincide with angular position 5 and its corresponding terminal 5 in this deck. Position 5, and it may be added at this juncture, positions 8 and 10 are angular positions that are attained when the cassette carriage is to be brought forward for reloading. Circumstances that surround this state will be explained later.

Depressing button 35 for setting up a half-film sequence will cause swinger 101B to rotate until a null point is reached when the gap in the swinger coincides with position 6. This again deenergizes solenoid 100 and puts the unit in readiness for a half-film sequence.

It is easy to see that to set up for a full-film, push button 36 is depressed and the solenoid stepped until null position 9 is reached.

Automatic sequencing while the cassette 44 is in parked position is brought about by a relay 139 that is mechanically coupled, as symbolized by broken line 140, with a normally open, automatic sequence contactor 141. Relay 139 is in series with a contact 142 that is closed when the carriage 44 is back in its parked position. Relay 139 and its series contact 142 are bridged by a large capacitor 143. Also provided is a contact 144 which is in series with a current limiting resistor 145 that connects to a conductor 146 which is the positive side of the D.C. source. Contact 144 is closed when the cassette carriage is forward and open when it is in parked position. Thus, as the carriage moves forward to make an exposure, or otherwise, capacitor 143 is charged through contact 144. When the carriage returns to parked position, contact 144 opens and contact 142 closes to discharge capacitor 143 through relay coil 139. Energization of relay 139 brings about closure of automatic sequencing contact 141. Upon this event, since another contact 147 is closed at any time that the cassette carriage is not in load position, there will be a completed circuit from the positive side of the line 135 through contacts 141, 147, and operator coil 100 to the negative side of the line 136. This pulsed operation, due to discharge of capacitor 143, causes solenoid 100 to advance decks 101B and 101A through one step or thirty degrees, in this example. At the same time, of course, the cams and stops shown in FIGURE 4 will advance rotationally a corresponding amount for reasons which were explained above. Whenever the carriage is in parked position, it is possible to advance the sequencer one step by depressing push button 38 in which case a closed series circuit is established from line 135 through single step push button 38, contact 138, and operator coil 100 and then to negative line 136. Interrupter contact 134 does not participate in single stepping, and hence, power will be applied to operator coil 100 as push button 38 is depressed.

Deck 101A is also driven in a step-by-step manner by solenoid 100. This deck controls the group of indicator lights that are collectively designated by the reference numeral 37. These lights go an to indicate the next film area that will be exposed when the cassette carriage is moved from parked to an exposure position. Deck 101A has twelve terminals and a rotary arm that is tipped with an arrowhead, as shown. When in the number 1 position, a circuit is completed to indicator lamp D by reason of it being connected between positive line 135 and a negative bus 148. When lamp D is illuminated, it indicates that the next exposure will be quarter-film area D. After that exposure, the sequencer will advance one step to close the circuit through terminal 2 of deck 101A. This extinguishes lamp D and lights lamp A to indicate that that corresponding area will be the next exposed when the carriage is moved forward. This sequence is repeated for the four quarter-films, and ultimately, deck 101A is automatically sequenced to number 5 position which causes a load indicator lamp 149 to go on, thus indicating that the sequence is completed and that the spot film device is ready for reloading. Cams 103 and 70, shown in FIGURE 4, are also at that time appropriately rotated to their number 5 angular position to establish some additional conditions for reloading which will be described in greater detail later.

It may be seen that when two consecutive half-film exposures are to be made that the contact arm associated with deck 101A will rotate to positions 6 and 7 respectively, and after completion of the sequence, position 8 will be attained at which time load light 149 will go on again. In position 6, current feeds from the common line associated with terminal 6 through a pair of diodes for energizing lamps A and D to indicate that the lower half of the film will be exposed the next time the cassette carriage is advanced. After that exposure and advancement to position 7 may be seen that current will feed through another pair of diodes to illuminate indicator lamps C and B, thereby indicating the second half of film area that will be exposed.

When the contact arm in switch deck 101A is rotated to position 9, it is easy to see that power will be supplied through the diodes for turning on all of the indicator lamps A, B, C, D, corresponding with a full-film exposure. After full-film exposure, and return of the cassette carriage 44 to parked position, the switch is sequenced to position 10 to turn on the load indicator lamp 149 again. This is accompanied by other conditions for reloading being established by cams 70 and 103 on the sequencer. In any case, it is only necessary to press transfer bar 31 after a sequence is completed to bring carriage 44 forward for reloading.

It was explained earlier that cassette carriage 44 is retracted to parked position under motor power and advanced forward for reloading or exposure under the influence of the coil spring 49. It was further explained that when the operator desired to park the cassette carriage if it was forward, cassette transfer bar 31 on the top of the spot film device would be depressed to bring about this action. Conversely, the next time transfer bar 31 is depressed, the cassette carriage moves forward under influence of the spring to either exposure or reload positions depending on the state of the sequencer.

It will be seen in FIGURE 16 that transfer bar 31 operates a maintained-contact switch that has two terminals 150A and 150B. The cassette carriage return motor is designated by the reference numeral 47 in FIGURE 16 as it is in FIGURE 3. In series with the motor is a contact 151 which is mechanically linked, as symbolized by broken line 152, with a motor starting solenoid 153. The actual location of contact 151 may be seen at the right side of FIGURE 3. Adjacent contact 151 is a latch 154 which may be operated by the link 152 which connects solenoid 153 to contact 151 in FIG. 16. The purpose of latch 154, referring to FIGURE 3, is to engage a pin 155 located on the cassette carriage 44 to prevent the carriage from inadvertent rearward movement when a cassette is inserted in holder 45 from the front of the spot film device. Latch 154 must be removed from this interferring position, of course, if motor 47 is to be permitted to retract the cassette carriage 44. Thus, when solenoid 153 is energizable, contact 151 closes to complete the circuit from switch contact 150B through motor 47. In series with motor-controlling solenoid 153 is a contact 156 which is opened if the cassette is not properly latched in its holder. Also in series with solenoid 153 is a contact 157 which is opened by the cassette carriage nearing its parked position to thereby de-energize solenoid 153 which in turn de-energizes motor 47 by opening switch contact 151 by means of link 152.

To move the cassette carriage 44 to the front of the spot film device, transfer bar 31 is pressed to connect switch terminal 150A in circuit. This causes a solenoid 52 to be energized, and as was explained earlier in connection with FIGURE 3, this causes a clutch release link 51 to be operated whereupon the cassette forward transfer spring 49 may move the cassette carriage without restraint by motor 47. At the same time that operation of transfer bar 31 brings the cassette carriage forward, a circuit is made through a lamp 158 which indicates that the cassette carriage has moved from its parked position to one of its forward positions.

It was mentioned earlier that switch 147 opened whenever the cassette carriage 44 is in load position. This is brought about by sequencer cam 103 rotating to one of its angular positions 5, 8, or 10 corresponding with reloading conditions, at which time switch 147, which is located next to the cam, see FIGURE 3, is actuated. This arrangement, then, prohibits sequencing when the cassette carriage is in load position.

Also operated by cam 103, when it is in one of its load positions, is a switch 159 which is adjacent switch 147 in FIGURE 3. Switch 159 is adapted to hold the X-ray exposure switches open when the spot film device is in reload condition so that the operator will be safe from unwanted X-ray exposure. The X-ray exposure control circuits are not shown because they are conventional and it is easy to see how this and other safety contacts may be connected in a circuit to prevent exposure unless conditions are correct.

Suitable switches are provided but not shown for changing the X-ray tube factors, such as filament voltages and anode voltage, from their fluoroscopic settings when the cassette carriage is to the rear to their radiographic settings when the cassette is moved forward for radiographing. These are also conventional and not essential to explaining the present invention so they are omitted.

As explained earlier in connection with the wiring diagram, certain switches are operated by the cassette carriage 44 being in the parked position. For this purpose, a switch actuator 160 on carriage 44 (see FIGURE 3) is adapted to operate switches 142, 161, and a combined switch having normally open and closed contacts 157 and 138. The four switches are located near the upper left corner of FIGURE 3 and are on a bracket. These switches may be of any type suitable for actuation by actuator 160 when carriage 44 approaches parked position. Switch 142 has already been described as the pulsing switch which closes when the carriage is parked and which energizes pulser solenoid operator 139 momentarily for automatic advancing of the sequencer. Switch 161 is not otherwise shown in the circuitry but serves the purpose of interlocking the X-ray exposure circuits for preventing the X-ray tube from operating in its radiographic mode when the cassette carriage is parked or in fluoroscopic position. Switch contact 157 has already been discussed in connection with de-energizing motor control solenoid 153 when the carriage 44 has reached its parked position. Contact 138 is in the same switch assembly as 157. Contact 138, it was explained earlier, closes when the carriage is in parked position, to enable the sequencer to be operated with the selector switches 34, 35, 36 or 38 only when the carriage is in parked position.

In summary, a spot film device has been described with which film sequences may be selected at a push button station that is either proximate with or remote from the device. Proper location of the film cassette carriage for radiography is controlled by a rotary sequencer that serves the additional purpose of cushioning the carriage and decelerating it at the same rate as it approaches any radiographic position. The sequencer is stepped automatically after each film to ready the device for the next film and to energize lamps that indicate the next film area that will be exposed. At the end of each sequence, the device is conditioned automatically for reloading cassettes. Crosswise travel of the cassette holder when necessary during a sequence is also controlled by the sequencer and requires no attention by the operator. The new spot film device eliminates the need for any concern by the operator as to whether a cassette is properly oriented in its holder because the device permits use of square cassettes which cannot be improperly oriented.

Although a preferred embodiment of the invention has been described in such detail as to enable one skilled in the art to reproduce it, such description is to be considered illustrative rather than limiting, because the invention may be variously embodied and is to be limited in scope only by interpretation of the claims which follow.

It is claimed:

1. A spot film device for moving an X-ray film cassette in and out of the path of an X-ray beam, comprising:

(a) a carriage that is adapted for guided movement in a first direction into the beam path, (b) a cassette holder that is supported on the carriage for movement in a second direction that is generally crosswise of the first direction, (c) sequencer means for controlling the carriage and cassette holder to execute movements between parked position and various preselected positions in the beam path, (d) said sequencer means including guide rod means that are located adjacent the carriage and in substantial parallelism therewith, (e) a stop carrier means mounted for sliding between limits along the axis of the rod means and for rotation about the same axis simultaneously with the rod means, (f) a plurality of carriage stops extending radially from the stop carrier in different angular relationships and spaced from each other in the axial direction of the carrier, (g) bumper means mounted on the carriage for moving with it across the rotational paths of the respective stops, (h) stepping motor means coupled with said stop carrier means for rotating it in angular steps, whereby to selectively position the stops in the paths of the bumper means and thereby establish the limits of carriage travel, (i) said stop carrier means comprising a cylinder that is slideable axially of the rod means as aforesaid, and (j) a piston means fixed on the rod means and in slideable sealing relation with the inside of the cylinder to define an air compression space between the piston means and end of the cylinder for decelerating said carriage.

2. The invention set forth in claim 1 including:

(a) a plurality of manually operable selector switches which correspond respectively with the film exposure sequence that is desired, (b) a source of electric power, (c) a control circuit including a rotary switch having a contact that is coupled with and rotatable step-by-step with the stepping motor and which rotary switch has a plurality of circularly distributed terminals that are engageable by the contact, (d) the said rotatable contact having a gap that disrupts electrical continuity between the rotatable contact and one terminal when the gap is in the same angular position as that terminal, (e) the different manually operable switches being in circuit with different ones of said stationary terminals to establish alternate paths between the power source and stepping motor means, (f) whereupon manually maintaining a selected one of said manually operable switches in its closed circuit state will advance the stepping motor until the gap reaches an angular position coinciding with the terminal in circuit with the operated switch to interrupt the motor circuit, whereby to position said stops for allowing movement of the carriage corresponding with the film positioning sequence that is selected.

3. The invention set forth in claim 1 including:

(a) a capacitor, (b) a D-C power source, (c) a first switch contact adapted to be closed in response to movement of the carriage toward the X-ray beam path to thereby connect the capacitor for being charged from the source, (d) a relay means and a second switch contact in series therewith and with the capacitor, said second contact being open when the carriage is moving toward the beam path and adapted to be closed when the carriage is substantially parked away from the beam path, whereby to discharge the capacitor through the relay means to operate the same, (e) a third contact in circuit with the stepping motor and the source and operable by the relay to energize the stepping motor for executing one angular step when the carriage is out of the beam path.

4. The invention set forth in claim 1 including:

(a) a counterweight means that is adapted to be moved rectilinearly in opposition to the cassette holder.

(b) a cable and pulley system connecting the counterweight to the cassette holder, (c) a spring that connects the counterweight and a fixed point and is preloaded when the counterweight is in one position for urging the same to another position, (d) a plurality of counterweight stops on the counterweight, each of said stops corresponding with a crosswise position of the cassette holder with respect to said carriage, (e) a latch means that is selectively engageable with the counterweight stops in accordance with the desired amount of movement of the cassette holder crosswise of the cassette carriage, (f) a cam fixed on said rod means for operating the latch means, said cam having latch operative and inoperative angular positions corresponding with said sequencer stops whereby to selectively operate the latch means to engage a counterweight stop corresponding with the desired final position of the cassette holder on the carriage.

5. A sequencer for a spot film device, comprising:

(a) a cylinder supporting axially spaced stops that extend radially and at different angles with respect to the axis of the cylinder, (b) a rod means extending through the cylinder so that the latter may slide on the rod means, (c) means coupling said rod means with the cylinder for joint rotation, (d) a stepping motor means for driving said rod means rotationally in equal angular steps, (e) an electric power source, (f) push button switch means that are selectively operable to connect said stepping motor means to the source, whereby to position said stops in predetermined angular positions, and (g) a piston means that is fixed with respect to the rod means in the cylinder for compressing air in opposition to axial movements of the cylinder.

References Cited

UNITED STATES PATENTS 2,817,766  12/1957  Leishman _____ 250—66

FOREIGN PATENTS 783,851  10/1957  Great Britain.

WILLIAM F. LINDQUIST, *Primary Examiner*.